United States Patent
Cohen

(10) Patent No.: US 8,516,568 B2
(45) Date of Patent: Aug. 20, 2013

(54) NEURAL NETWORK DATA FILTERING AND MONITORING SYSTEMS AND METHODS

(76) Inventor: Elliot D. Cohen, Port Saint Lucie, FL (US)

( * ) Notice: Subject to any disclaimer, the term of this patent is extended or adjusted under 35 U.S.C. 154(b) by 168 days.

(21) Appl. No.: 13/163,384

(22) Filed: Jun. 17, 2011

(65) Prior Publication Data
US 2012/0324565 A1    Dec. 20, 2012

(51) Int. Cl.
*G06F 9/00*     (2006.01)
*G06F 15/18*    (2006.01)

(52) U.S. Cl.
USPC .............................................. 726/12; 706/12

(58) Field of Classification Search
USPC ................. 726/12; 706/12; 600/27
See application file for complete search history.

(56) References Cited

U.S. PATENT DOCUMENTS

| | | | |
|---|---|---|---|
| 5,800,535 A | 9/1998 | Howard |
| 6,493,587 B1 | 12/2002 | Eckmiller |
| 6,497,699 B1 | 12/2002 | Ludvig |
| 6,530,954 B1 | 3/2003 | Eckmiller |
| 6,970,746 B2 | 11/2005 | Eckmiller |
| 7,058,445 B2 | 6/2006 | Kemere |
| 7,120,486 B2 | 10/2006 | Leuthardt |
| 7,187,968 B2 | 3/2007 | Wolf |
| 7,209,788 B2 | 4/2007 | Nicolelis |
| 7,257,439 B2 | 8/2007 | Llinas |
| 7,260,430 B2 | 8/2007 | Wu |
| 7,392,079 B2 | 6/2008 | Donoghue |
| 7,499,894 B2 | 3/2009 | Marom |
| 7,546,158 B2 | 6/2009 | Allison |
| 7,548,775 B2 | 6/2009 | Kipke |
| 7,613,509 B2 | 11/2009 | Wolf |
| 7,751,877 B2 | 7/2010 | Flaherty |
| 7,818,065 B2 | 10/2010 | Llinas |
| 7,881,780 B2 | 2/2011 | Flaherty |
| 7,899,556 B2 | 3/2011 | Nathan |
| 2004/0267320 A1 | 12/2004 | Taylor |

(Continued)

FOREIGN PATENT DOCUMENTS

| CN | 1556450 A | 12/2004 |
|---|---|---|
| CN | 1949139 A | 4/2007 |

(Continued)

OTHER PUBLICATIONS

Bak et al., "Visual sensations produced by intracortical micro stimulation of the human occipital cortex," Med. Biol. Eng. Comput. (1990) 28:257-259.

(Continued)

*Primary Examiner* — Techane Gergiso
(74) *Attorney, Agent, or Firm* — Novak Druce Connolly Bove & Quigg LLP

(57) ABSTRACT

Systems and methods are disclosed for filtering data in a neural network environment to filter out inappropriate content. In some embodiments, a data signal including a sensible representation is received. The sensible representation included in the data signal is produced in a sensible format. From the sensible representation in the sensible format, a clean copy of the sensible representation can be generated such that any inappropriate content present within the received data signal is not reproduced in the clean copy. Optionally, additional filtering can occur before and/or after the generating of the clean copy. The (filtered) clean copy of the sensible representation is sent to a network. Embodiments can permit the filtering of input to and/or output from a network.

40 Claims, 7 Drawing Sheets

(56) References Cited

U.S. PATENT DOCUMENTS

| | | | |
|---|---|---|---|
| 2005/0085744 A1 | 4/2005 | Beverina | |
| 2006/0206161 A1 | 9/2006 | Nicolelis | |
| 2007/0049814 A1 | 3/2007 | Muccio | |
| 2007/0067003 A1 | 3/2007 | Sanchez | |
| 2007/0213786 A1 | 9/2007 | Sackellares | |
| 2007/0250119 A1* | 10/2007 | Tyler et al. | 607/2 |
| 2008/0015459 A1 | 1/2008 | Llinas | |
| 2008/0177197 A1 | 7/2008 | Lee | |
| 2008/0235164 A1 | 9/2008 | Tian | |
| 2010/0016732 A1 | 1/2010 | Wells | |
| 2010/0087853 A1 | 4/2010 | Kipke | |
| 2010/0106348 A1* | 4/2010 | Hinchey et al. | 701/11 |
| 2010/0217356 A1 | 8/2010 | Bikson | |
| 2011/0066219 A1 | 3/2011 | Llinas | |
| 2011/0282169 A1* | 11/2011 | Grudic et al. | 600/324 |
| 2011/0298706 A1* | 12/2011 | Mann | 345/157 |
| 2011/0307079 A1* | 12/2011 | Oweiss et al. | 623/27 |
| 2012/0035765 A1* | 2/2012 | Sato et al. | 700/264 |

FOREIGN PATENT DOCUMENTS

| | | |
|---|---|---|
| CN | 1949140 A | 4/2007 |
| CN | 101219048 A | 7/2008 |
| CN | 101301244 A | 11/2008 |
| CN | 101433461 A | 5/2009 |
| CN | 101436100 A | 5/2009 |
| CN | 101455596 A | 6/2009 |
| CN | 101477405 A | 7/2009 |
| CN | 201308487 Y | 9/2009 |
| CN | 101571747 A | 11/2009 |
| CN | 101576772 A | 11/2009 |
| CN | 101776981 A | 7/2010 |
| CN | 101853070 A | 10/2010 |
| KR | 20030017124 A | 3/2003 |
| WO | 2008024346 A2 | 2/2008 |
| WO | 2008024346 A3 | 2/2008 |
| WO | 2008097201 A1 | 8/2008 |
| WO | 2009146361 A1 | 12/2009 |
| WO | 2010008276 A1 | 1/2010 |
| WO | 2010117264 A1 | 10/2010 |
| WO | 2010147913 A1 | 12/2010 |

OTHER PUBLICATIONS

Fletcher and Henson, "Frontal lobes and human memory: Insights from functional neuroimaging," Brain (2001) 124 (5): 849-881.

Demb et al., "Semantic encoding and retrieval in the left inferior prefrontal cortex: A functional MRI study of task difficulty and process specificity," J of Neuroscience (1995) I5(g): 5870-5878.

Hanslmayr et al.,"Brain Oscillations dissociate between semantic and nonsemantic encoding of episodic memories," Cerebral Cortex (2009) 19: 1631-1640.

Webopedia, Retrieved on May 9, 2012 from http://www.webopedia.comITERM/N/neural_network.htm.

Wicker, "Unlocking the silent prison," Parade (2010) p. 18.

Dobelle, "Artificial vision for the blind by connecting a television camera to the visual cortex," ASAIO Journal (2000) p. 3-9.

* cited by examiner

1

NEURAL NETWORK DATA FILTERING AND MONITORING SYSTEMS AND METHODS

FIELD OF TECHNOLOGY

The present disclosure relates to methods and systems for filtering data in a neural network environment. More particularly, the present disclosure is directed to systems and methods for filtering data in a neural network environment to filter out inappropriate content.

BACKGROUND

A neural network is a network involving or pertaining to a human or animal brain. A neural network can be a system of programs and data structures that approximates the operation of a human or animal brain, such as artificial intelligence. It can be a network involving an artificial brain, such as a biological-electronic hybrid brain, a bio-chemical brain, an electrical brain, etc. In short, a neural network can be a network including any brain. Often times, a neural network including a brain utilizes a brain-machine interface (BMI) for external interaction and communication, that is to say, interaction and communication outside the neural network (e.g., with another network).

BMI technologies have been developed and are being further advanced and improved. Many BMI technologies relate to externalizing brain action potential, such as recording electrical signals from neurological activity in motor regions of the cerebral cortex, using either surface or deep electrodes, and transmitting these signals to a processor, which then controls movement of a prosthetic limb, computer cursor, or other external device. A particular example involves the encoding of hand motion.

Meanwhile, other BMI technologies send information to the brain, such as translating neural signals into movements performed by a machine and providing sensory feedback. Another example involves providing input to the visual cortex. A further related example provides sensory input to the auditory cortex.

In addition, advances in neuroimaging, especially magnetic resonance imaging (MRI), have increased knowledge of encoding of memory and have provided evidence that specific areas of the frontal lobe are active in certain types of memory just as certain sensory areas of the cortex are responsible for certain types of sensing. Further, different types of electrical brain wave activities have been identified in the encoding of semantic episodic memory as distinguished from non-semantic episodic memory. Advances in understanding of both semantic (language-related) and non-semantic (object-related) memory encoding suggest that BMI technologies for sending and receiving memory signals to and from the brain, comparable to those that can key into sensory cortexes, are also feasible. Moreover, technology has also been disclosed that programs as well as monitors neural brain responses to electrical stimulation.

In light of the expanding BMI technologies, such as receiving and transmitting data signals by a neural network, there is a need for prevention of inappropriate data from entering and/or exiting a neural network. Currently, filters are commonly installed onto computers and computer networks to provide protection against cyber attacks, Trojans, worms, viruses, and other malware (malicious software) that disrupt or compromise computer operations, privacy, and data. Current computers and computer networks also commonly include content filters that guard against accidental or unintended sending or receiving of confidential information, spam, offensive messages, or other unauthorized or unwanted content. However, there is presently not similar filtration for neural networks.

SUMMARY

Additional features and advantages of the concepts disclosed herein are set forth in the description which follows, and in part will be obvious from the description, or may be learned by practice of the described technologies. The features and advantages of the concepts may be realized and obtained by means of the instruments and combinations particularly pointed out in the appended claims. These and other features of the described technologies will become more fully apparent from the following description and appended claims, or may be learned by the practice of the disclosed concepts as set forth herein.

The present disclosure describes methods and systems for filtering data in a neural network environment to filter out inappropriate content. In some embodiments, a data signal including a sensible representation (including but not limited to a visual, auditory, gustatory, tactile, cognitive, olfactory, kinesthetic, and motor representation) is received. The sensible representation included in the data signal is produced in a sensible format. From the sensible representation in the sensible format, a clean copy of the sensible representation can be generated such that any inappropriate content present within the received data signal is not reproduced in the clean copy. Optionally, additional filtering can occur before and/or after the generating of the clean copy. The (filtered) clean copy of the sensible representation is sent to a network.

In other embodiments, the present disclosure describes an exemplary system comprising, inter alia, a transceiver, a sensible representation sensor, and a processor. The transceiver can receive a data signal including a sensible representation, including but not limited to a visual, auditory, gustatory, tactile, cognitive, olfactory, kinesthetic, and motor representation. The sensor can sense, detect, capture, and/or record the sensible representation in a sensible format. Using the sensible representation sensed, captured and/or recorded by the sensor, the system can generate a clean copy of the representation, thus filtering out any inappropriate content by not replicating the inappropriate content that may be present, embedded, and/or hidden in the received data signal including the representation. One with ordinary skill in the art will recognize that the clean copy can be generated by the sensor, by the processor using the representation captured/recorded by the sensor, or by any other similar technique utilizing the representation captured/recorded by the sensor. Optionally, the system can also comprise an additional filter(s). The filter(s) can screen out (e.g., blur, censor) any inappropriate material (e.g., obscenity, profanity, confidential data, proprietary data) before and/or after the clean copy is generated.

The foregoing and other objects, features and advantages of the present disclosure will become more readily apparent from the following detailed description of exemplary embodiments as disclosed herein.

BRIEF DESCRIPTION OF THE DRAWINGS

In order to best describe the manner in which the above-described embodiments are implemented, as well as define other advantages and features of the disclosure, a more particular description is provided below and is illustrated in the appended drawings. Understanding that these drawings depict only exemplary embodiments of the invention and are not therefore to be considered to be limiting in scope, the examples will be described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other steps and orders of steps may be used without parting from the spirit and scope of the disclosure.

A representation is a measurable, quantifiable data set for a cognitive, sensory, or motor quality. The data set can "represent" a corresponding quality such as a certain sound, taste, odor, feel, or sight. Accordingly, a signal carrying data about a particular sensation can be represented by a measurable and quantifiable data set. These representations can in turn be copied by translating them into a signal carrying only code for the particular sensation in question.

Sensible representations are representations that can be recognized by a physiological sensing capacity. Sensible representations are capable of being sensed, felt, and/or perceived. For example, a visually sensible representation can be a picture or image, formed by pixels. The visually sensible representation (e.g., picture, image) can be viewed/seen (i.e., sensed) by the physiological sense of sight, including biological sight, or by electronic, mechanical, bioelectric, bionic, or electromechanical sight, or by some other hybrid or artificial sight. Moreover, an audibly sensible representation can, for example, be an audible sound. The sound can be sensed and/or heard by a biological ear, or by an electronic, mechanical, bioelectric, bionic, or electromechanical microphone, or by some other hybrid or artificial ear. A third example of a sensible representation can be a smell or odor, capable of being sensed by a biological nose, or by an electronic, mechanical, bioelectric, bionic, or electromechanical nose, or by some other hybrid or artificial nose.

Accordingly, a sensible representation may be produced in a sensible format. For example, a visual representation (e.g., picture, image) may be produced in a visible format, such as a picture or image format displayed on a screen or monitor. Thus the visual representation in the picture/image format can be viewed/seen (i.e., sensed) by biological (e.g., eyes) or electronic sight (e.g., camera). Another example can be illustrated with an audibly sensible representation, such as a sound. The sound can be produced in an audible/hearable format, such as by being played on speakers or earphones. In this audible/hearable format, the sound can be recognized and/or interpreted (i.e., sensed) by an ear or microphone.

Figure 1:
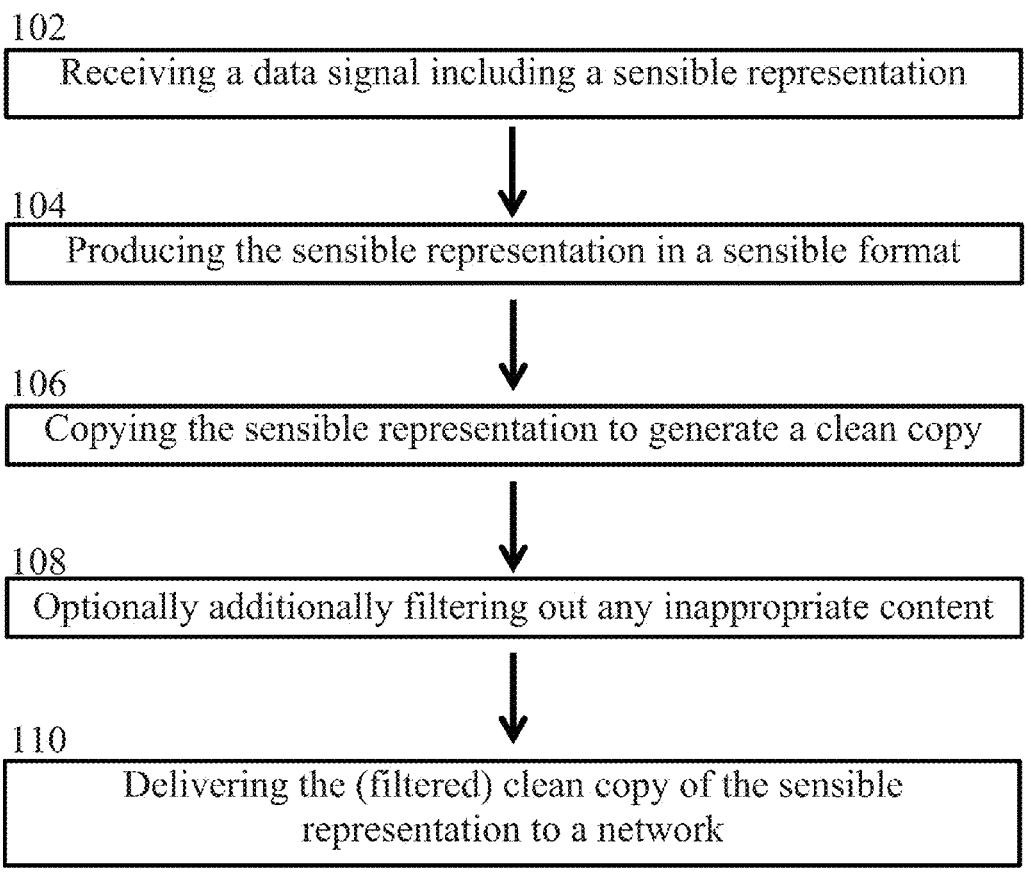
FIG. 1 illustrates an example method embodiment.

An exemplary method embodiment is illustrated in FIG. 1. The exemplary method embodiment receives a data signal 102, which can be saved, sent to an administrator, archived, etc. This data signal can include a sensible representation in the form of a visual image, an audio sound, a taste, a touch, a cognition, a smell, a motion, a motor sense, or any other sensible representation. The method produces 104 the sensible representation in a sensible format. For example, a sensible format for a visual representation can be a picture or image format, which can be displayed and viewed/seen on a screen or monitor. Another example of a sensible format can be illustrated with an auditory representation being produced in a sound/audio format, which can be played from speakers/earphones and be heard.

From the sensible representation produced in a sensible format, the method copies the representation and generates 106 a "clean" copy of the representation. If any malicious, unintended, or other inappropriate content (e.g., software viruses, software Trojans, worms, spyware, adware) is present, embedded, and/or hidden within the data signal, then generating a copy of the representation included in the data signal filters out and prevents the inappropriate (including malicious or unintended) material from being reproduced in the copy. Thus, the copy is a "clean" copy. For example, if the data signal includes a sensible representation such as a visual image, then the method uses the image produced in a visual format to generate a clean visual copy of this image, thereby preventing any malicious or inappropriate code (e.g., software viruses, software Trojans, worms, spyware, adware) embedded and/or hidden within the image file (i.e., within the code forming the image) from being reproduced. To reiterate, the method generates a clean copy from the image in the sensible format (e.g., a visual picture format), rather than by copying the bytes of data forming the image. In other words, the method generates a clean copy of the image visually, without having to rely on the code making up the image file. The method can save this clean copy for later use if needed.

Optionally, the method can also (scan/detect and) filter out 108 any inappropriate material (e.g., obscenities, profanities, confidential data, proprietary data) from the image itself and/or apply conventional methods of malicious code scanning (e.g., antivirus software). This additional filtering (e.g., for obscenities and/or for viruses) 108 can occur before and/or after generating a clean copy 106. The method can also save the filtered clean copy for later use. The method then sends 110 the clean (and filtered) copy of the image to a network, such as to a neural network or to a computer network.

In a particular non-limiting exemplary embodiment, the method receives 102 a data signal including a sensible representation in the form of a visual picture. The data signal can be from a source such as a computer network, Internet, intranet, or local device. The visual representation can be produced 104 in a visible picture/image format and presented on a screen or display. The method can then, for example, utilize a camera to capture the picture on the display and then generate a clean copy of the picture 106. This prevents any inappropriate (e.g., malicious, unauthorized) code embedded, included, and/or hidden within the picture file from being spread further.

Moreover, the method can optionally apply additional filters 108 to screen out any other inappropriate material (e.g., blur obscene images in the picture, censor out profanities in the picture, quarantine and/or remove viruses, Trojans, worms, spyware, and adware). The optional filtering 108 can take place before and/or after the generating of the clean copy 106. If the filtering 108 takes place before, then the filtering will be applied on the initially received picture. After the received picture has been filtered 108, the camera can then capture the filtered picture and a clean copy can be generated 106 from the captured filtered picture. The method then sends 110 the clean copy of the filtered picture to a network, such as a neural or computer network.

In addition, the filtering 108 can occur after the generating of the clean copy 106. In this case, the method generates a clean copy of the received picture 106 and then filtering 108 is applied on the clean copy. The method then sends 110 the filtered clean copy to a network, such as a neural network. The filtered clean copy of the picture can, for example, be sent 110 to a BMI interfacing with a neural network.

In some embodiments, the method can receive 102 a data signal including a sensible representation from a neural network. For example, in an exemplary method embodiment, a human or animal brain in a neural network can conceive a visual image. The conception of the visual image can be interpreted by a BMI interfacing with that neural network. The example method embodiment receives 102 a data signal including the visual image from the BMI interfacing with the neural network. The method embodiment can produce 104 the visual image in a picture format. The method then generates 106 a clean copy of the visual image in the picture format. For example, the method can utilize a camera to capture the visual image in the picture format displayed on a screen or monitor and then generate a clean copy of the image 106. This filters out and prevents any inappropriate (including unintended, private, or unauthorized) material embedded and/or hidden within the data signal including the image from being further transmitted. For example, the brain may have inadvertently or unknowingly included private or unauthorized information (i.e., inappropriate information), such as social security and credit card information, in its conception of the visual image. Generating the clean copy 106 from the image in the visible picture format can prevent any inappropriate material from being leaked.

In addition, the method can optionally implement a filter 108 on the initially received image and subsequently generate a clean copy 106 from the filtered image, and/or the method can generate a clean copy 106 of the received image and subsequently apply filtering 108 on the clean copy. Then the method sends 110 the (filtered) clean copy to a network, such as a communication network (e.g., Internet, intranet, electronic messaging networks, or other computer networks) or even another neural network (e.g., to a BMI interfacing with another neural network).

In some embodiments, the method receives 102 a data signal including a sensible representation such as semantic content (i.e., meaningful language) from a neural network (i.e., from a human or animal brain). The semantic content can be produced 104 in a sensible format, such as a readable text format. The method then copies the semantic content in the text format to generate a clean copy of the text 106 such that any inappropriate (e.g., unauthorized, private, malicious) data present and/or hidden within the data signal is excluded from the copy. Also, the method can optionally scan the text against predefined or preapproved matching criteria (i.e., defined or approved prior to the scanning) for unauthorized or private data (e.g., social security numbers, birth dates, secrets, or other confidential or unauthorized data), which in some cases may be hidden. If any unauthorized data (i.e., inappropriate content) is detected during the optional scanning, then the method filters it out 108, thereby preventing the unauthorized data from being replicated and further transmitted. Moreover, as previously mentioned, the filtering 108 can take place before and/or after the generating of the clean copy 106. The method then sends 110 the (filtered and) clean copy of the semantic content to a network, such as a computer network or a neural network.

While throughout the above description the technology has been described as pertaining to visual images or pictures, any sensible representation can be used with the technology. It is fully contemplated herein to be able to receive a data signal including a sensible representation such as a visual, auditory, gustatory, tactile, cognitive, olfactory, kinesthetic, motor representation, and other sensible representations. Those of ordinary skill in the art will appreciate that, for example, with respect to an auditory representation, the method can produce the auditory representation in an audible sound format and can utilize a microphone or sound recorder to capture/record the sound. Then using this captured/recorded sound in the audible format, the method can generate a clean copy of the auditory representation. In short, the method can receive a data signal including a sound (e.g., a sound file), play the sound file, and record a clean copy of the sound using a microphone, thereby preventing any inappropriate material within the initial sound file (e.g., within the code of the sound file) from being reproduced in the clean copy.

Similarly, persons of ordinary skill in the art will understand that generating a clean copy of a gustatory, tactile, olfactory, kinesthetic, or motor representation can be accomplished by utilizing an electronic tongue, a pressure sensor, an electronic nose, a motion sensor, or command recognizer (e.g., command recognition software), respectively. It is also fully contemplated that a biological, or an electronic, mechanical, bioelectric, bionic, electromechanical, or some other hybrid or artificial tongue, pressure sensor, nose, motion sensor, or command recognizer can be utilized. In addition, a clean copy of a cognitive representation can be generated utilizing a photographic recorder for visual text and symbols, a microphone for voice and sound, a pressure sensor for a tactile representation such as Braille, and/or other correlating sensors for other sensible representations.

Figure 2A:
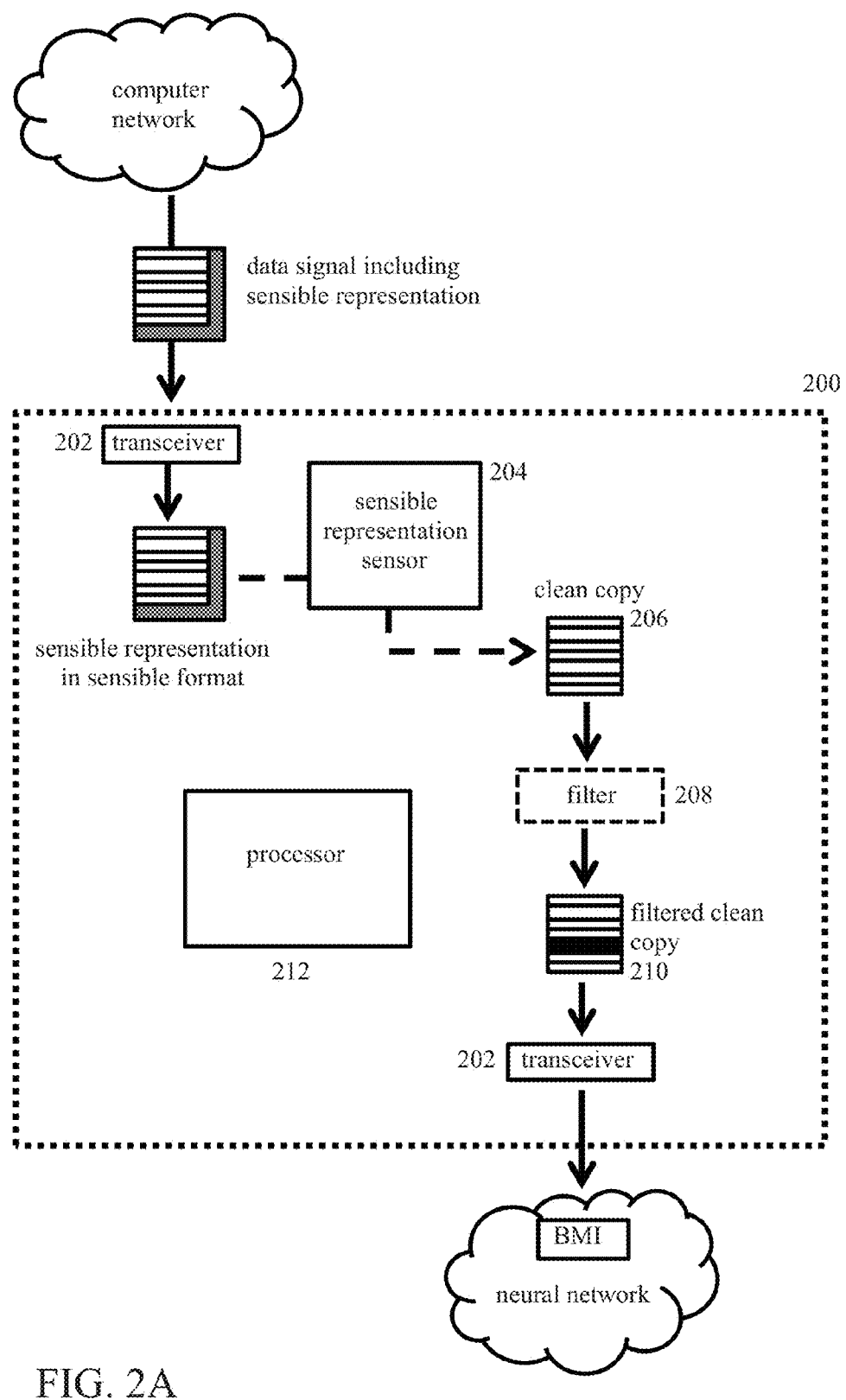
FIG. 2A illustrates an example system embodiment.

FIG. 2A shows an exemplary system embodiment 200. The exemplary system embodiment comprises, inter alia, a transceiver 202, a sensible representation sensor 204, and a processor 212. The transceiver 202 can receive a data signal including a sensible representation, which can be stored and saved in memory for subsequent use, archived, etc. In this example, the data signal is received from a computer network. However, this is for illustration purposes only. It is fully contemplated that the data signal can be received from any source, including but not limited to a neural network (i.e., from a BMI interfacing with a neural network) or even a local source. The example embodiments described herein apply to inputting to and/or outputting from a neural network and/or a computer network.

Moreover, the data signal can include any sensible representation, including but not limited to a visual, auditory, gustatory, tactile, cognitive, olfactory, kinesthetic, and motor representation. The sensor 204 can detect, capture, and/or record the sensible representation produced in a sensible format. Using the sensible representation captured or recorded by the sensor 204, the system can generate a clean copy 206 of the representation, thus filtering out any inappropriate content (e.g., malicious, unwanted, unauthorized, private, personal, confidential information) by not replicating the inappropriate content that may be present, embedded, and/or hidden in the received data signal including the representation. One with ordinary skill in the art will recognize that the clean copy can be generated by the sensor 204, by the processor 212 using the representation captured/recorded by the sensor 204, or by any other similar technique utilizing the representation captured/recorded by the sensor 204. This clean copy can also be stored, saved, archived, etc.

Figure 2B:
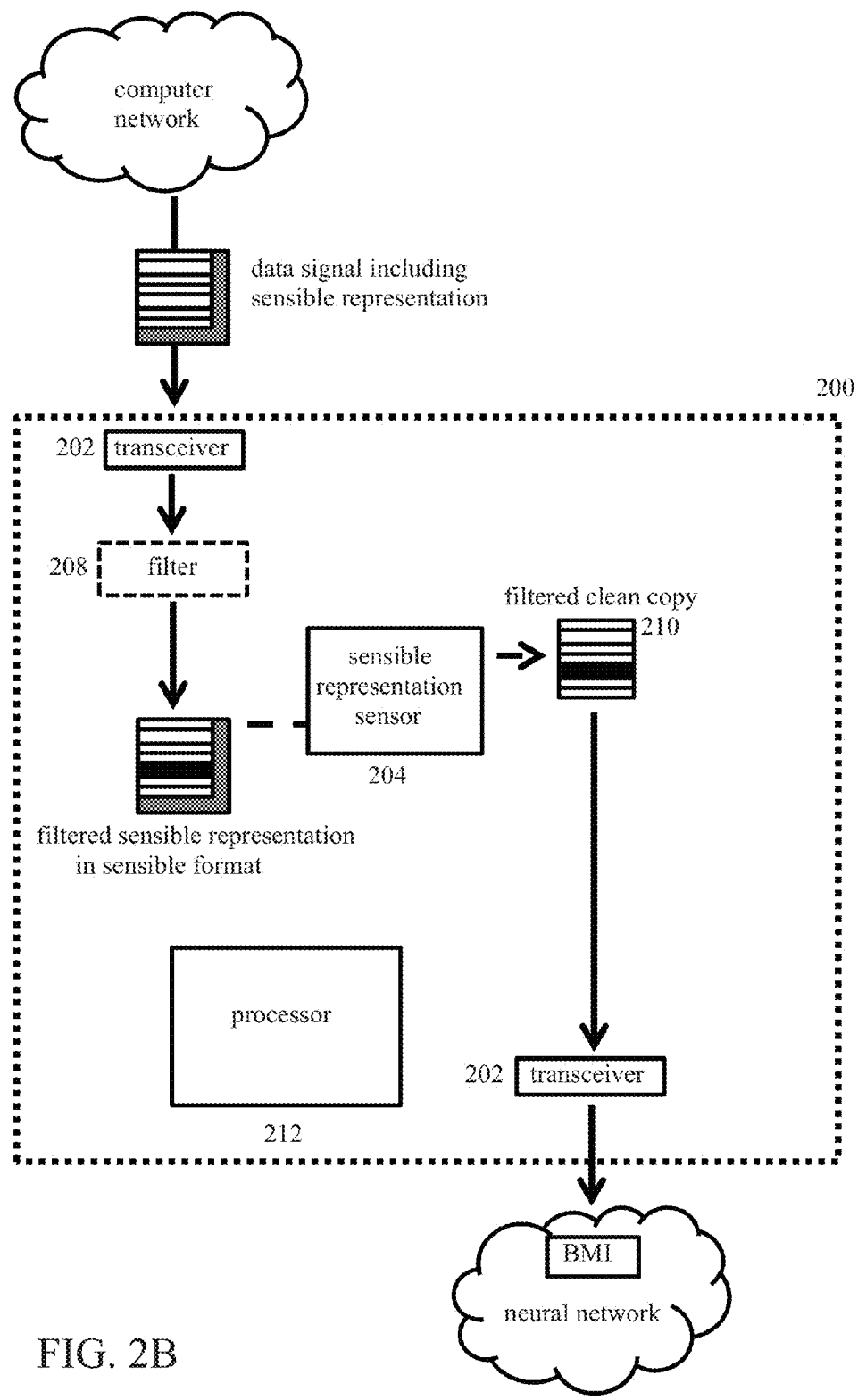
FIG. 2B illustrates an example system embodiment.
Figure 2C:
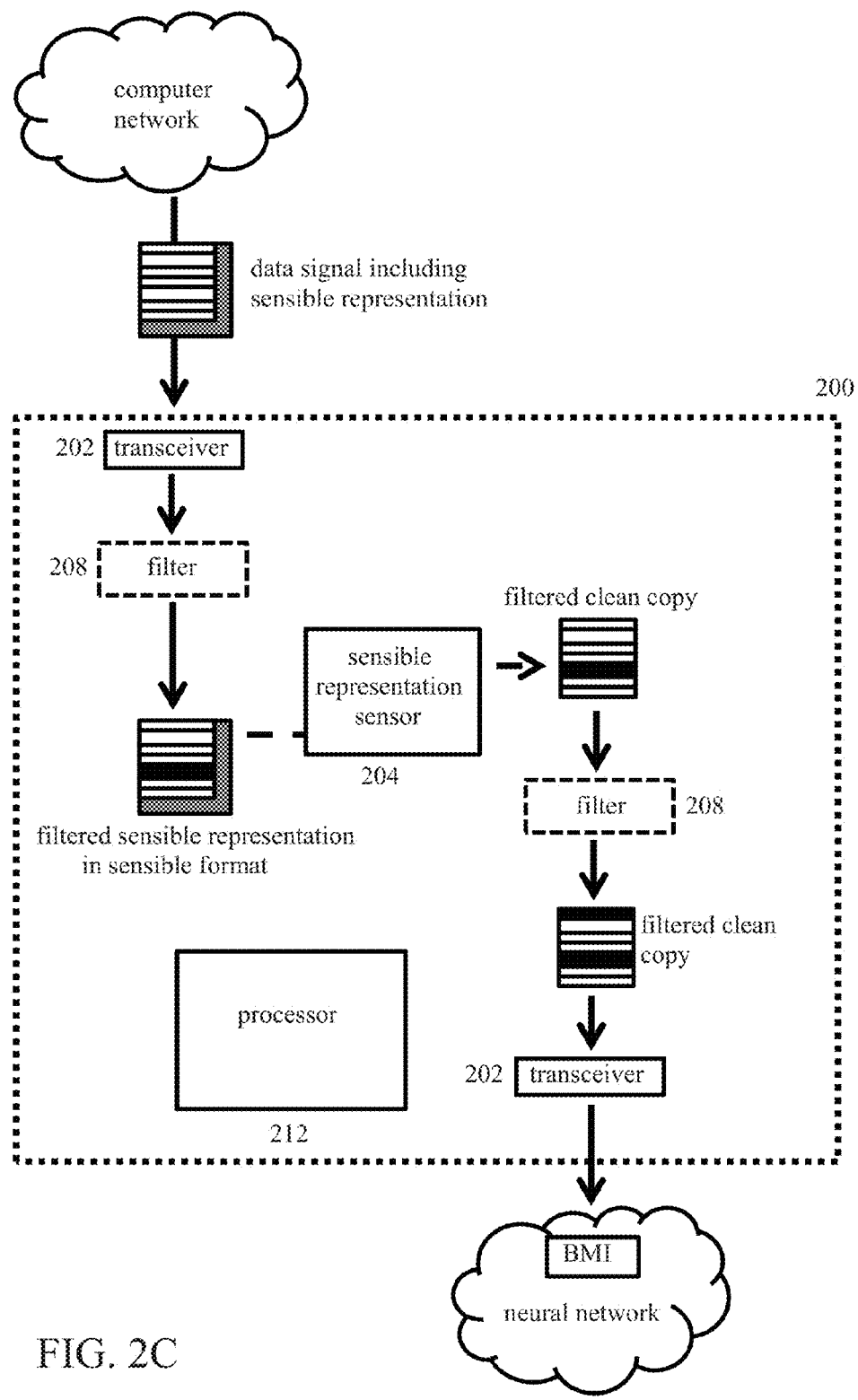
FIG. 2C illustrates an example system embodiment.

Optionally, the system can also comprise an additional filter 208. This filter 208 can screen out (e.g., blur, censor) any inappropriate material (e.g., obscenity, profanity) inherent in the sensible representation. This filter 208 can also implement an anti-malware (anti-malicious software) technique, including but not limited to antivirus software and/or scanning for Trojans, worms, adware, spyware, etc. This filter 208 can be applied after a clean copy is generated, as shown in FIG. 2A, or before the clean copy is generated, as in FIG. 2B, or there can be filters before and after the clean copy is generated, as shown in FIG. 2C. Moreover, the (filtered) clean copy 210 of the visual image can be stored and saved in memory, sent to an administrator, archived, etc. The transceiver 202, which can be the same component for receiving the data signal, then sends the (filtered) clean copy 210 to a network. Again, in these example embodiments, the network where the (filtered) clean copy 210 is to be sent is a neural network. However, this network is in no way limited to being a neural network and can be a computer network, the Internet, an intranet, an electronic communication network, etc. In fact, these example embodiments apply to both inputting to and/or outputting from a neural network and/or a computer network.

Figure 3:
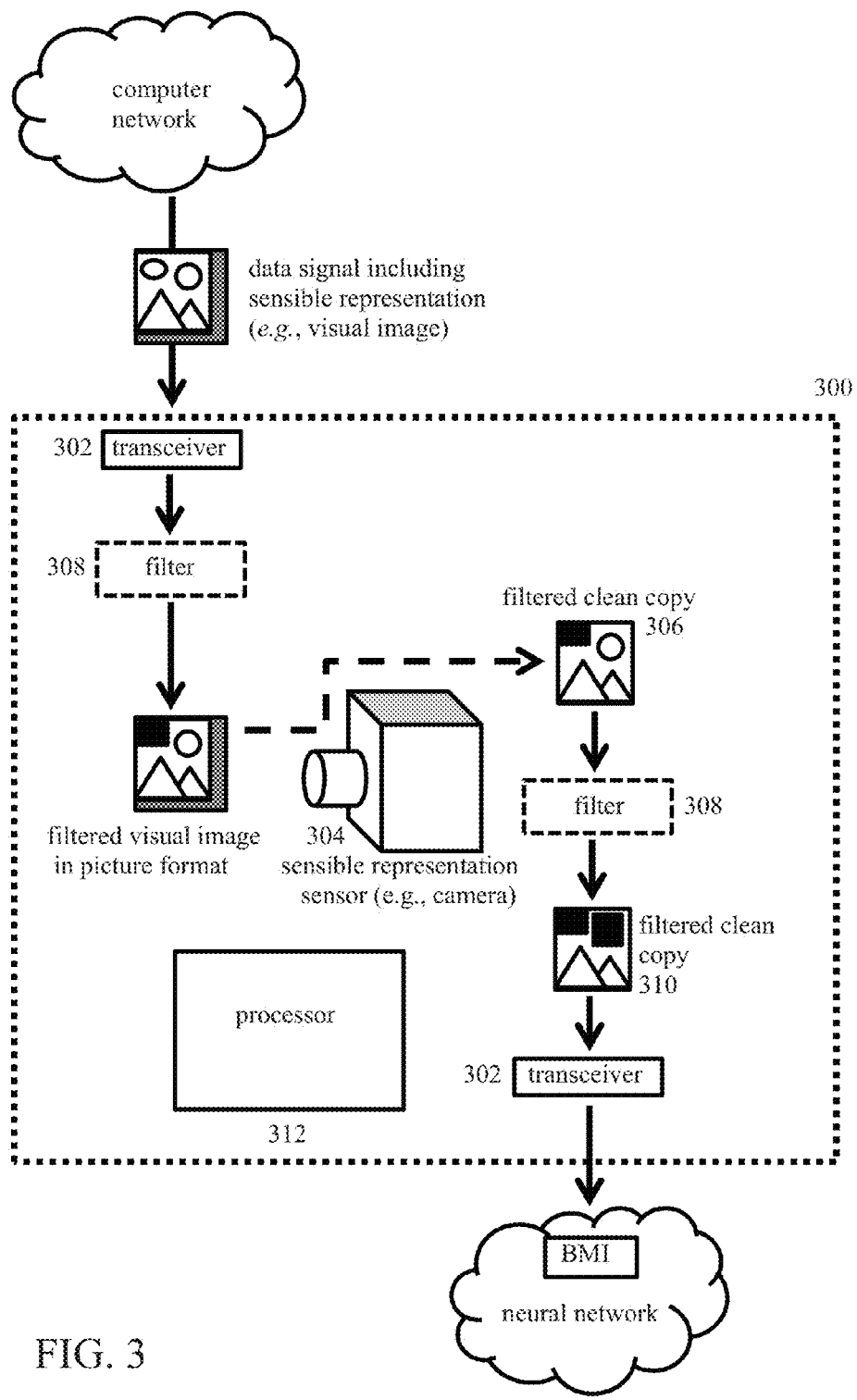
FIG. 3 illustrates an example system embodiment pertaining to a visually sensible representation.

FIG. 3 illustrates an exemplary system embodiment 300 pertaining to a visually sensible representation. The exemplary system embodiment comprises, inter alia, a transceiver 302, a sensible representation sensor in the form of a camera 304, and a processor 312. The transceiver 302 can receive a data signal including a sensible representation, which can be saved, stored, archived, etc. In this particular example, the data signal includes a visual representation in the form of pixels, making up an image or picture. As such, the sensor 304 can be a photographic camera because the sensible representation is a visual representation. The visual image representation is produced in a picture format such that the camera 304 can capture/record the visual image. Using the image captured/recorded by the camera 304, the system can generate a clean copy 306 of the visual image, thus filtering out any inappropriate content present, embedded, and/or hidden in the received data signal including the visual image. Again, one of ordinary skill in the art will understand that the camera 304 itself can generate the clean copy 306, or the processor 312 can do so using the image captured/recorded by the camera 304, or another similar technique utilizing the image captured/recorded by the camera 304 can generate the clean copy. This clean copy can also be saved, stored, or archived, etc.

As discussed above, an additional filter 308 can be implemented to screen out (e.g., blur, censor) any inappropriate material (e.g., obscenity, profanity, confidential data, proprietary data) inherent in the visual image. The filter 308 can also block any inappropriate content in the form of malware (e.g., by applying malware scanning software). The filter(s) 308 can be implemented before and/or after a clean copy is generated. When a clean copy of the visual image is generated (and filtered), it can also be stored and saved in memory for later use. The transceiver 302 then sends the (filtered) clean copy to a network.

Figure 4A:
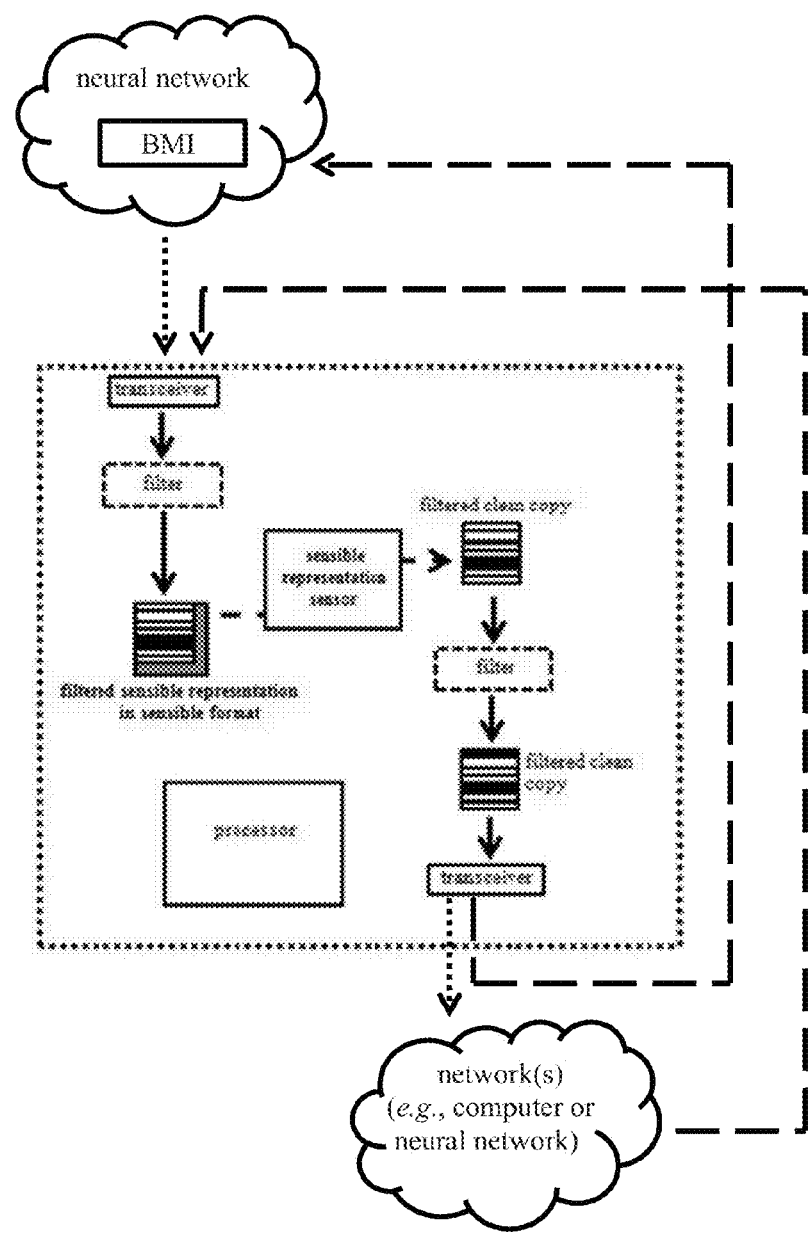
FIG. 4A illustrates an example system embodiment operating as a single unit.
Figure 4B:
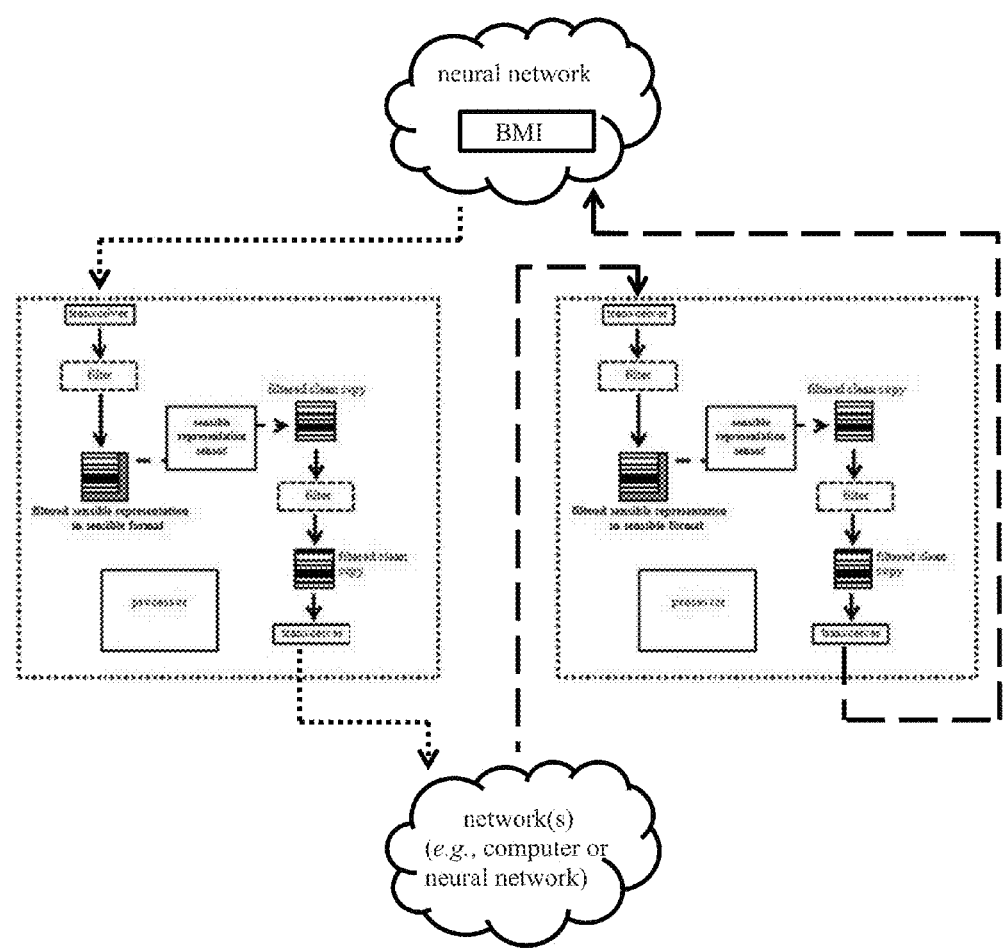
FIG. 4B illustrates an example system embodiment operating as separate units.

A person of ordinary skill in the art will understand that the system embodiments described above can operate as a single unit or as separate units. For example, the exemplary system embodiments described above can be implemented as a single unit (see FIG. 4A) that allows data transmission between a first neural network and a computer network and/or a second neural network, such that a data signal can be received from the first neural network and then sent to the computer network and/or to the second neural network, or vice versa (i.e., data signal received from the computer network and/or from the second neural network and then sent to the first neural network). Alternatively, separate units (see FIG. 4B) can be implemented such that one unit may handle data signals received from a first source sent to a second source, while another unit may handle data signals received from the second source sent to the first. Again, the embodiments described herein permit the filtering of input to and/or output from a neural network and/or a computer network. One of ordinary skill in the art will recognize that other implementations and embodiments may be used without departing from the spirit and scope of the disclosure.

Furthermore, referring back to FIG. 2A, FIG. 2B, and FIG. 2C, it is not necessary for the sensible representation sensor 204 to be a hardware component, such as a camera, microphone, electronic tongue, a pressure sensor, an electronic nose, or a motion sensor. The sensible representation sensor can also be implemented as a software component. For example, in some embodiments, the sensible representation sensor 204 can be a software component implementing an algorithm that can sense, detect, capture, and/or record the sensible representation and generate or construct a clean copy of the sensible representation. In this case, the sensible representation may be produced in a virtual sensible format, one capable of being read by the software sensible representation sensor 204.

It is also noteworthy to mention that an exemplary application of the present disclosure can provide reliable filtration that does not necessarily have a period in which no filter exists to prevent incoming or outgoing inappropriate data transmissions. Conventional digital computer filters need to be continually updated as new threats arise. Consequently, there is a period in which no filter exists to prevent transmissions containing inappropriate content (e.g., new threats). However, due to filtration by generating a clean copy of a sensible representation to prevent inappropriate content, an exemplary application of present disclosure does not necessarily have such a period in which no filter exists to prevent incoming or outgoing inappropriate data transmissions.

Moreover, because BMI technologies can interface not only with forms of artificial intelligence but also with human or animal brains, the standard for filtration and prevention of inappropriate content should be higher and more reliable than conventional standards. Having a human brain "crash" (i.e., caused by inappropriate content) can be viewed as a much more regrettable event than the usual computer crash. An example application of the present disclosure can provide such better and more reliable filtration, by generating a clean copy of a sensible representation to prevent inappropriate content.

Furthermore, another example application of the present disclosure can allow for enhancement of cognition without unwanted data or malicious code sent to or from a neural network. The unwanted data or malicious code may include programming aimed at "mind control," or other input not authorized or permitted by the recipient or sender. The example application can enhance cognition while preventing such unwanted data or malicious code from entering or exiting the neural network.

A further example application permits the secure downloading or uploading of information to restore semantic memory to an individual with Alzheimer's disease or vascular dementia, or when a portion of the individual's brain such as the hippocampus or other memory-related brain region is damaged or compromised. In such cases, clean memory files can be sent to or from a neural network of the individual because inappropriate content can be filtered out and prevented.

Other example applications of the present disclosure can do one or more in the following non-exhaustive list: prevent private information in a neural network from being uploaded from or downloaded to an unauthorized source; prevent advertisers from gaining access to the content of an online neural network and from downloading "cookies" or other unwanted programming to the neural network; permit visually and/or audibly impaired individuals to securely access the Internet or other digital data network via a BMI; prevent inappropriate content from being uploaded to or downloaded from a neural network interacting with a source involving virtual reality and/or gaming; and permit secure communication among two or more remote neural networks (e.g., mind-to-mind communication).

The various embodiments and applications described above are provided by way of illustration only and should not be construed to limit the invention. Those skilled in the art will readily recognize various modifications and changes that may be made to the present description without following the example embodiments and applications illustrated and described herein, and without departing from the true spirit and scope of the present disclosure.

I claim:

1. A method for filtering malicious content in a neural network environment comprising the steps of:
   receiving, from a first network, a data signal set including data for producing a sensible representation in a sensible format, wherein the first network is a computer network or neural network;
   filtering for malicious content in the received data signal set by the steps of:
      producing, from the received data signal set, the sensible representation in the sensible format;
      sensing the produced sensible representation format using a sensible representation format sensor;
      generating a clean copy data signal set from the produced sensible representation format;
      wherein the clean copy data signal set excludes the malicious content;
   storing the generated clean copy data signal set corresponding to the produced sensible representation format; and
   sending the generated clean copy data signal set to a second network, wherein the second network is a computer network or neural network;
   wherein at least one of the first network or second network is communicatively linked to a brain machine interface to receive or send the data signal sets from or to the neural network, wherein the brain in the brain machine interface is biological.

2. The method of claim 1 further comprising:
   filtering out inappropriate content inherent within the sensible representation included in the data signal set.

3. The method of claim 1 further comprising:
   filtering out inappropriate content present within the data signal set by using a set of defined matching criteria.

4. The method of claim 1 further comprising:
   filtering out inappropriate content present within the data signal set by applying an anti-malware technique.

5. The method of claim 1, wherein the first network is communicatively linked to the brain machine interface of the neural network environment, and wherein the receiving of the data signal set is performed via the brain machine interface.

6. The method of claim 1, wherein the second network is communicatively linked to the brain machine interface of the neural network environment, and wherein the sending of the clean copy data signal set is performed via the brain machine interface.

7. The method of claim 1 wherein the sensible representation is a visual representation and the sensible format is a visible format.

8. The method of claim 1 wherein the sensible representation is an auditory representation and the sensible format is an audible format.

9. The method of claim 1 wherein the sensible representation is a gustatory representation and the sensible format is a gustatory format.

10. The method of claim 1 wherein the sensible representation is a tactile representation and the sensible format is a tactile format.

11. The method of claim 1 wherein the sensible representation is a cognitive representation and the sensible format is a format being at least one of: a visible format, an audible format, or a tactual format.

12. The method of claim 1 wherein the sensible representation is an olfactory representation and the sensible format is a format sensed using an odor sensor.

13. The method of claim 1 wherein the sensible representation is a kinesthetic representation and the sensible format is a format sensed using a motion sensor.

14. The method of claim 1 wherein the sensible representation is a motor representation and the sensible format is a format recognized using a command recognizer.

15. A system for filtering malicious content in a neural network environment comprising:
   a transceiver configured to receive, from a first network, a data signal set including data for producing a sensible representation in a sensible format, wherein the first network is a computer network or neural network;
   a sensible representation producer configured to produce the sensible representation in the sensible format using the data to yield a produced sensible representation;
   at least one sensible representation format sensor for the sensible format, the at least one sensible representation format sensor being configured to sense the produced sensible representation format, wherein at least one signal from the at least one sensible representation format sensor is stored, in a generated clean copy data signal set, as cleaned data corresponding to the produced sensible representation format;
   wherein the transceiver is further configured to send the clean copy data signal set to a second network, wherein the second network is a computer network or neural network; and
   a brain machine interface, wherein at least one of the first network or the second network is communicatively linked to the brain machine interface of the neural network environment, wherein the brain in the brain machine interface is biological; and
   wherein the sensible representation producer and the at least one sensible representation format sensor are implemented as a filtering device for filtering malicious content in the received data signal set.

16. The system of claim 15 further comprising:
   a filter for filtering out inappropriate content inherent within the sensible representation included in the data signal set.

17. The system of claim 15 further comprising:
   a filter for filtering out inappropriate content present within the data signal set by using a set of defined matching criteria.

18. The system of claim 15 further comprising:
   a filter for filtering out inappropriate content present within the data signal set by applying an anti-malware technique.

19. The system of claim 15 further comprising: wherein the sensible representation format sensor includes a software component implementing an algorithm for sensing the produced sensible representation format and yielding the at least one signal to be stored, in the clean copy data signal set, as the cleaned data corresponding to the produced sensible representation format.

20. The system of claim 15 wherein the sensible representation is a visual representation and the sensible representation format sensor is a camera.

21. The system of claim 15 wherein the sensible representation is a visual representation and the sensible representation format sensor is a hybrid or artificial eye.

22. The system of claim 15 wherein the second network is communicatively linked to the brain machine interface; and
wherein the sensible representation is a visual representation and the sensible representation format sensor is a biological eye, the biological eye utilized, at least in part, to generate the clean copy data signal set to be sent to the second network via the brain machine interface.

23. The system of claim 15 wherein the sensible representation is an auditory representation and the sensible representation format sensor is a microphone.

24. The system of claim 15 wherein the sensible representation is an auditory representation and the sensible representation format sensor is a hybrid or artificial ear.

25. The system of claim 15
wherein the second network is communicatively linked to the brain machine interface; and
wherein the sensible representation is an auditory representation and the sensible representation format sensor is a biological ear, the biological ear utilized, at least in part, to generate the clean copy data signal set to be sent to the second network via the brain machine interface.

26. The system of claim 15 wherein the sensible representation is a gustatory representation and the sensible representation format sensor is a hybrid or artificial tongue.

27. The system of claim 15
wherein the second network is communicatively linked to the brain machine interface; and
wherein the sensible representation is a gustatory representation and the sensible representation format sensor is a biological tongue, the biological tongue utilized, at least in part, to generate the clean copy data signal set to be sent to the second network via the brain machine interface.

28. The system of claim 15 wherein the sensible representation is a tactile representation and the sensible representation format sensor is a hybrid or artificial tactile sensor.

29. The system of claim 15
wherein the second network is communicatively linked to the brain machine interface; and
wherein the sensible representation is a tactile representation and the sensible representation format sensor is a biological tactile sensor, the biological tactile sensor utilized, at least in part, to generate the clean copy data signal set to be sent to the second network via the brain machine interface.

30. The system of claim 15 wherein the sensible representation is a cognitive representation and the sensible representation format sensor includes at least one of: a camera, a microphone, or a tactile sensor.

31. The system of claim 15 wherein the sensible representation is a cognitive representation and the sensible representation format sensor includes at least one of: a hybrid or artificial eye, a hybrid or artificial ear, or a hybrid or artificial tactile sensor.

32. The system of claim 15
wherein the second network is communicatively linked to the brain machine interface; and
wherein the sensible representation is a cognitive representation and the sensible representation format sensor includes at least one of a biological eye, a biological ear, or a biological tactile sensor, the sensible representation format sensor utilized, at least in part, to generate the clean copy data signal set to be sent to the second network via the brain machine interface.

33. The system of claim 15 wherein the sensible representation is an olfactory representation and the sensible representation format sensor is a hybrid or artificial nose.

34. The system of claim 15
wherein the second network is communicatively linked to the brain machine interface; and
wherein the sensible representation is an olfactory representation and the sensible representation format sensor is a biological nose, the biological nose utilized, at least in part, to generate the clean copy data signal set to be sent to the second network via the brain machine interface.

35. The system of claim 15 wherein the sensible representation is a kinesthetic representation and the sensible representation format sensor is a hybrid or artificial motion sensor.

36. The system of claim 15
wherein the second network is communicatively linked to the brain machine interface ; and
wherein the sensible representation is a kinesthetic representation and the sensible representation format sensor is a biological motion sensor, the biological motion sensor utilized, at least in part, to generate the clean copy data signal set to be sent to the second network via the brain machine interface.

37. The system of claim 15 wherein the sensible representation is a motor representation and the sensible representation format sensor is a hybrid or artificial command recognizer.

38. The system of claim 15
wherein the second network is communicatively linked to the brain machine interface; and
wherein the sensible representation is a motor representation and the sensible representation format sensor is a biological command recognizer, the biological command recognizer utilized, at least in part, to generate the clean copy data signal set to be sent to the second network via the brain machine interface.

39. The system of claim 15, wherein the first network is communicatively linked to the brain machine interface of the neural network environment, and wherein the receiving of the data signal set is performed via the brain machine interface.

40. The system of claim 15, wherein the second network is communicatively linked to the brain machine interface of the neural network environment, and wherein the sending of the clean data signal set is performed via the brain machine interface.

* * * * *